US012795197B2

(12) United States Patent
Yuan

(10) Patent No.: US 12,795,197 B2
(45) Date of Patent: Nov. 10, 2026

(54) LIVE-STREAMING METHOD, APPARATUS, ELECTRONIC DEVICE AND STORAGE MEDIUM

(71) Applicant: Douyin Vision Co., Ltd., Beijing (CN)

(72) Inventor: Zhiqiang Yuan, Beijing (CN)

(73) Assignee: Douyin Vision Co., Ltd., Beijing (CN)

( * ) Notice: Subject to any disclaimer, the term of this patent is extended or adjusted under 35 U.S.C. 154(b) by 39 days.

(21) Appl. No.: 18/868,696

(22) PCT Filed: Aug. 29, 2023

(86) PCT No.: PCT/CN2023/115386
§ 371 (c)(1),
(2) Date: Nov. 22, 2024

(87) PCT Pub. No.: WO2024/051518
PCT Pub. Date: Mar. 14, 2024

(65) Prior Publication Data
US 2025/0358472 A1 Nov. 20, 2025

(30) Foreign Application Priority Data
Sep. 7, 2022 (CN) ........................ 202211089949.4

(51) Int. Cl.
*H04N 21/437* (2011.01)
*H04N 21/2187* (2011.01)
*H04N 21/61* (2011.01)

(52) U.S. Cl.
CPC ....... *H04N 21/437* (2013.01); *H04N 21/2187* (2013.01); *H04N 21/6125* (2013.01)

(58) Field of Classification Search
CPC ............. H04N 21/437; H04N 21/2187; H04N 21/6125; H04N 21/2335; H04N 21/234309; H04N 21/25816; H04N 21/4788
See application file for complete search history.

(56) References Cited

U.S. PATENT DOCUMENTS 8,243,924 B2 * 8/2012 Chen .................... H04N 21/238 380/217
9,417,765 B1 * 8/2016 Lewis ................ H04N 21/6125
(Continued)

FOREIGN PATENT DOCUMENTS

CN 103327417 A 9/2013
CN 106506632 A 3/2017
(Continued)

OTHER PUBLICATIONS

Search Report for Chinese Patent Application No. 202211089949.4, 2 pages.
(Continued)

*Primary Examiner* — Fernando Alcon
(74) *Attorney, Agent, or Firm* — Astute IP Law Group

(57) ABSTRACT

Embodiments of the present disclosure provide a live-streaming method and apparatus, and an electronic device and a storage medium. The method includes: determining, through a browser, audio and video information being used during live-streaming in the browser, packaging the audio and video information to obtain an audio and video data packet; and transmitting, through a network transmission capability of the browser, the audio and video data packet to a target live-streaming server to cause the target live-streaming server to distribute the audio and video information.

20 Claims, 9 Drawing Sheets

(56) References Cited

U.S. PATENT DOCUMENTS 9,668,002 B1* 5/2017 Baron ................ H04N 21/2187
10,410,673 B2* 9/2019 Balko ........................ G06F 9/54
10,419,826 B2* 9/2019 Geduldig ........... H04N 21/4316
11,290,687 B1* 3/2022 Becchetti ................. H04N 7/15
11,910,128 B2* 2/2024 Pinter .................... H04N 7/181
2004/0119814 A1* 6/2004 Clisham ......... H04N 21/440281 348/E7.083
2008/0043091 A1* 2/2008 Lia ........................ H04M 7/003 348/14.09
2008/0068448 A1* 3/2008 Hansen .................... H04N 7/15 348/E7.083
2010/0198981 A1* 8/2010 Hsiao ............. H04N 21/234309 375/240.01
2010/0231556 A1* 9/2010 Mines ................... G06F 3/0418 345/173
2011/0235499 A1* 9/2011 Rajasekar ............. H04M 9/082 370/201
2011/0249574 A1* 10/2011 Karacali-Akyamac ...................... H04L 41/145 370/252
2012/0173621 A1* 7/2012 Crosbie ............ H04N 21/47202 709/204
2013/0163758 A1* 6/2013 Swaminathan ........... H04L 9/08 380/259
2013/0198654 A1* 8/2013 Jones .................... H04L 65/403 715/753
2013/0300818 A1* 11/2013 Fu ....................... H04L 65/4015 348/E7.083
2015/0186744 A1* 7/2015 Nguyen ................. H04N 19/46 382/190
2015/0304607 A1* 10/2015 Bader-Natal ........ H04L 12/1822 348/14.08
2015/0341634 A1 11/2015 Jiang
2015/0356195 A1* 12/2015 Kilzer ...................... H04N 5/85 715/234
2016/0094601 A1* 3/2016 Besehanic ............... H04L 67/60 709/219
2016/0117159 A1* 4/2016 Balko ................. G06F 9/44526 717/177
2017/0187478 A1* 6/2017 Shah ...................... H04M 15/82
2018/0131741 A1* 5/2018 Song ..................... H04L 65/764
2018/0152736 A1* 5/2018 Alexander ......... H04N 21/6587
2018/0255332 A1* 9/2018 Heusser ................. H04H 20/18
2019/0166171 A1 5/2019 Jiang
2020/0128286 A1* 4/2020 Anders ............ H04N 21/23418
2020/0177581 A1* 6/2020 Vijayaraghavan ........................... G06Q 20/4014
2021/0144658 A1 5/2021 Han et al.
2022/0150446 A1* 5/2022 Fernandez ............... H04N 7/15
2023/0209110 A1* 6/2023 Ward ................. H04N 21/4622 725/32
2024/0385734 A1* 11/2024 Lindmark ............... G11B 27/11

FOREIGN PATENT DOCUMENTS

CN 107995187 A 5/2018
CN 111064973 A 4/2020
CN 112073423 A 12/2020
CN 113079526 A 7/2021
CN 113163416 A 7/2021
CN 113498164 A 10/2021
CN 114222149 A 3/2022
CN 114257841 A 3/2022
CN 115665474 A 1/2023
WO WO-2019075581 A1 * 4/2019 ............. H04N 5/265

OTHER PUBLICATIONS

International Search Report for PCT/CN2023/115386, mailed on Nov. 15, 2023, 6 pages.

Extended European Search Report received for European Application No. 23862214.6, mailed on Feb. 13, 2026, 10 pages.

* cited by examiner

LIVE-STREAMING METHOD, APPARATUS, ELECTRONIC DEVICE AND STORAGE MEDIUM

CROSS-REFERENCE TO RELATED APPLICATION(S)

This application is a U.S. National Stage Application of PCT International Application No. PCT/CN2023/115386, filed on Aug. 29, 2023, which claims priority to Chinese Patent Application No. 202211089949.4, filed with the China National Intellectual Property Administration on Sep. 7, 2022, the disclosures of which are incorporated herein by reference in their entireties.

FIELD

Embodiments of the present disclosure relate to the technical field of live-streaming, and for example, to a live-streaming method and apparatus, and an electronic device and a storage medium.

BACKGROUND

Live-streaming has become an important way for people to communicate and engage in entertainment, and traffic pushing in a live-streaming process can be achieved by installing client software or downloading a Flash plugin from a browser. However, browsers are gradually phasing out support for the Flash function, making it difficult for the browsers to achieve live-streaming pushing. However, installing the client software for live-streaming requires skillful use and operation on a client, and the live-streaming process is often cumbersome. In an actual operation process, live-streaming can be started normally only if the live-streaming process is guided. Therefore, it is particularly important to achieve live-streaming without adding additional complex operations.

SUMMARY

The present disclosure provides a live-streaming method and apparatus, and an electronic device and a storage medium, to play a real-time live-streaming video in a browser.

In a first aspect, the embodiments of the present disclosure provide a live-streaming method. The method includes: determining, through a browser, audio and video information being used during live-streaming in the browser: packaging the audio and video information to obtain an audio and video data packet; and transmitting, through a network transmission capability of the browser, the audio and video data packet to a target live-streaming server to cause the target live-streaming server to distribute the audio and video information.

In a second aspect, the embodiments of the present disclosure provide a live-streaming apparatus. The apparatus includes: an audio and video information determining module, configured to determine, through a browser, audio and video information being used during live-streaming in the browser; an audio and video data packet determining module, configured to package the audio and video information to obtain an audio and video data packet; and an audio and video information distribution module, configured to: transmit, through a network transmission capability of the browser, the audio and video data packet to a target live-streaming server to cause the target live-streaming server to distribute the audio and video information.

In a third aspect, the embodiments of the present disclosure provide an electronic device. The electronic device includes: one or more processors; and a storage apparatus, configured to store one or more programs, wherein the one or more programs, when run by the one or more processors, cause the one or more processors to implement the live-streaming method provided in the first aspect or the second aspect.

In a fourth aspect, the embodiments of the present disclosure further provide a storage medium including computer-executable instructions. When executed by a computer processor, the computer-executable instructions are used for performing the live-streaming method provided in the first aspect or the second aspect.

BRIEF DESCRIPTION OF THE DRAWINGS

Throughout the accompanying drawings, identical or similar reference numerals represent identical or similar elements. It should be understood that the accompanying drawings are illustrative, and components and elements may not necessarily be drawn to scale.

DETAILED DESCRIPTION OF EMBODIMENTS

Figure 1:
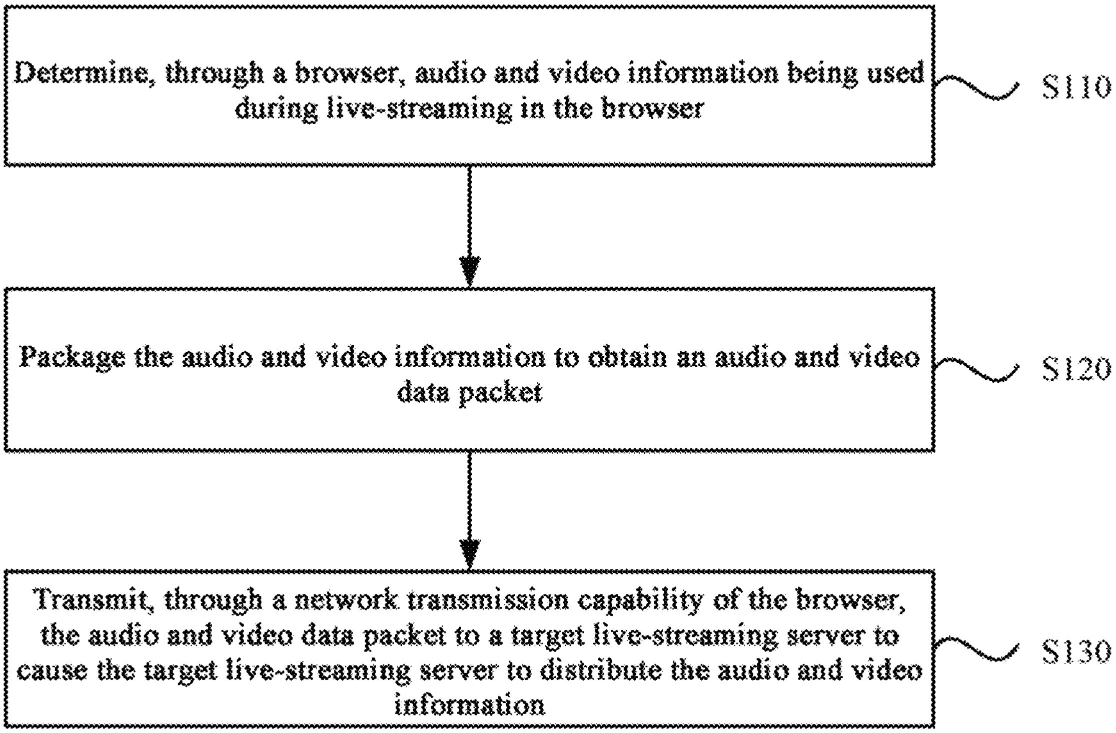
FIG. 1 is a flowchart of a live-streaming method according to an embodiment of the present disclosure.

It should be understood that multiple steps recorded in method implementations of the present disclosure can be executed in different orders and/or in parallel. In addition, the method implementations may include additional steps and/or omit the execution of the steps shown. The scope of the present disclosure is not limited in this aspect.

The term "include" and its variants as used herein mean widespread inclusion, namely, "including but not limited to". The term "based on" is "based at least in part on". The term "one embodiment" means "at least one embodiment". The term "another embodiment" means "at least another embodiment". The term "some embodiments" means "at least some embodiments". Relevant definitions of other terms will be given in the description below.

It should be noted that the concepts such as "first" and "second" mentioned in the present disclosure are only used to distinguish different apparatuses, modules, or units, and are not intended to limit the order or interdependence of the functions performed by these apparatuses, modules, or units.

It should be noted that the modifications of "one" and "plurality" mentioned in the present disclosure are indicative rather than restrictive, and those skilled in the art should understand that unless otherwise explicitly stated in the context, they should be understood as "one or more".

Messages or names of information interacted between a plurality of apparatuses in the implementations of the present disclosure are only for illustrative purposes and are not intended to limit the messages or the scope of the information.

It can be understood that before use of the technical solutions disclosed in various embodiments of the present disclosure, users should be informed of the type, scope of use, usage scenarios, and the like of personal information involved in the present disclosure in accordance with relevant laws and regulations in an appropriate manner, so as to obtain authorization from the users.

For example, in response to that an active request of a user has been received, prompt information is sent to the user to clearly remind the user that personal information of the user needs to be involved in an operation requested to be executed. Thus, the user can independently select whether to provide the personal information to software or hardware such as an electronic device, an application program, a server, or a storage medium that performs the operation of the technical solutions of the present disclosure according to the prompt information.

As an exemplary implementation, in response to that an active request of a user has been received, prompt information is sent to the user through, for example, a pop-up window where the prompt information can be presented in text. In addition, the pop-up window can also carry a selection control for the user to select whether to "agree" or "refuse" to provide the personal information to the electronic device.

It can be understood that the above notification and the above user authorization obtaining process are only illustrative and do not constitute a limitation on the implementations of the present disclosure. Other methods that meet the relevant laws and regulations can also be applied to the implementations of the present disclosure.

FIG. 1 is a flowchart of a live-streaming method according to an embodiment of the present disclosure. This embodiment of the present disclosure is applicable to a situation for live-streaming in a browser. The method can be performed by a live-streaming apparatus. The apparatus can be implemented in the form of software and/or hardware. For example, the apparatus is implemented through an electronic device. The electronic device can be a mobile terminal, a personal computer (PC) end, a server, or the like. As shown in FIG. 1, the method provided in this embodiment of the present disclosure may include, but not limited to step S110 to step S130 below:

S110. Through a browser, audio and video information being used during live-streaming in the browser is determined.

Figure 2:
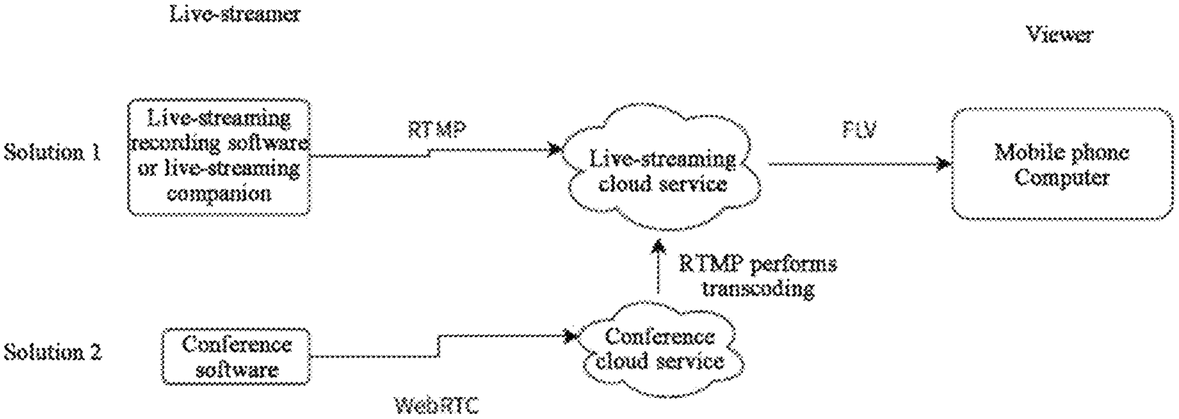
FIG. 2 is a flowchart of a relevant live-streaming mode according to an embodiment of the present disclosure.
Figure 3:
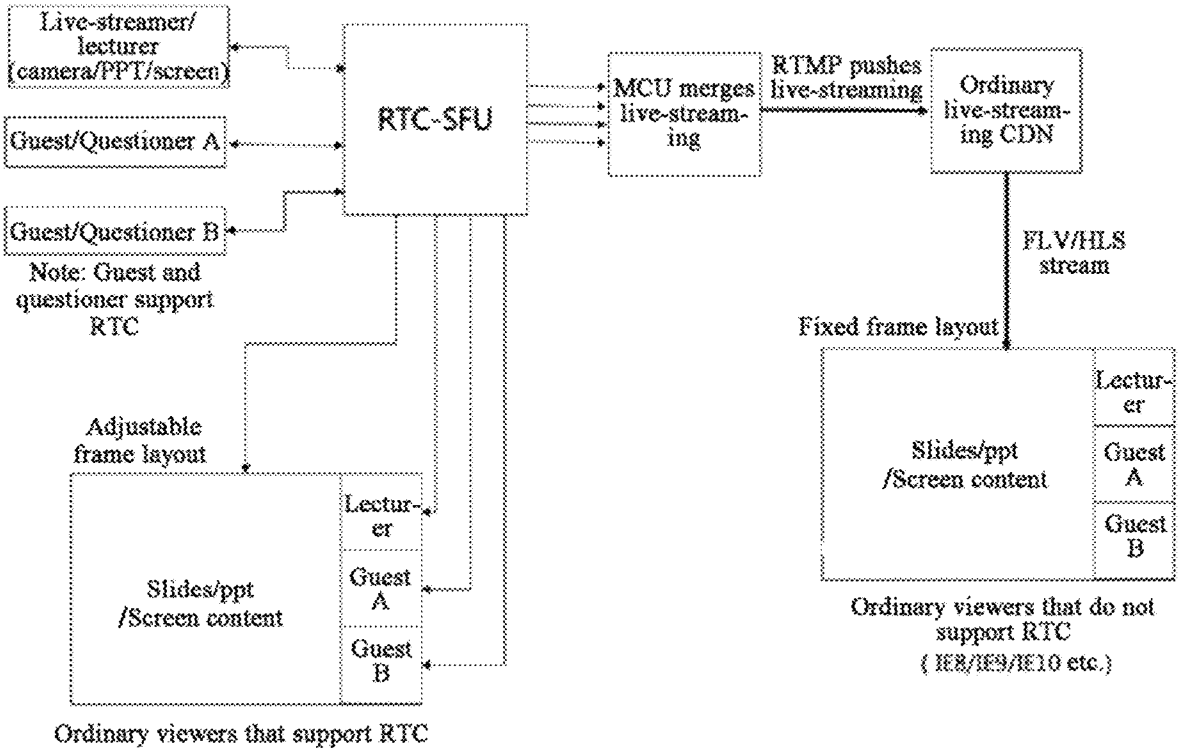
FIG. 3 is a flowchart of relevant use of conference software to relay live-streaming according to an embodiment of the present disclosure.

Referring to FIG. 2, in Solution 1, native client software (e.g. live-streaming recording software or live-streaming companion) is installed on a PC end, and Real Time Message Protocol (RTMP) is used to directly push live-streaming cloud services. In Solution 1, software needs to be installed on the PC end, and direct login and use cannot be achieved after the device is changed. Referring to FIG. 3, in Solution 2, conference software is used to relay live-streaming, and a conference Web client is used. The client uses a WebRTC protocol to communicate with a conference cloud service. Audio and video content in a room is merged into a stream. The client calls an Application Program Interface (API) or a server calls the API. A conference server uses the RTMP to push the merged stream to live-streaming. In this solution, retweeting is needed, which has high retweeting cost and stability risk, and the quality cannot be improved.

In the above solutions, the client software or the conference software needs to implement live-streaming pushing during live-streaming, so that the live-streaming process is often cumbersome. In this technical solution of this embodiment, during the live-streaming in the browser, the audio and video information being used during the live-streaming is determined through the browser and is transmitted through the browser. The audio and video information includes, but is not limited to, locally cached audio and video information and online shared audio and video information. Selection of the audio and video information can be determined by the browser according to an actual live-streaming need.

S120. The audio and video information is packaged to obtain an audio and video data packet.

Packaging may mean packaging data information and presenting it in a new and complete form. For example, the audio and video information is packaged to obtain a complete audio and video data packet and is transmitted in the form of an audio and video data packet.

S130. The audio and video data packet is transmitted, through a network transmission capability of the browser, to a target live-streaming server to cause the target live-streaming server to distribute the audio and video information.

In this embodiment, the audio and video information being used during the live-streaming determined through the browser can be packaged into the audio and video data packet, and the audio and video data packet can be transmitted to the target live-streaming server through the network transmission capability, thereby achieving the distribution of the audio and video information for watching by more users.

According to the live-streaming method provided in this embodiment of the present disclosure, through a browser, audio and video information being used during live-streaming in the browser is determined; the audio and video information is packaged to obtain an audio and video data packet; and the audio and video data packet is transmitted, through a network transmission capability of the browser, to a target live-streaming server to cause the target live-streaming server to distribute the audio and video information. By use of this technical solution of this embodiment of the present disclosure, the entire process of gathering, encoding, packaging, and live-streaming pushing of the audio and video information is completed in the browser. The packaged audio and video information is transmitted to the target live-streaming server through a network to play live-streaming videos in real time in the browser. Furthermore, the entire process does not involve audio and video transcoding, thereby avoiding high transcoding cost, potential stability risk, inability to improve the quality, and the like.

Figure 4:
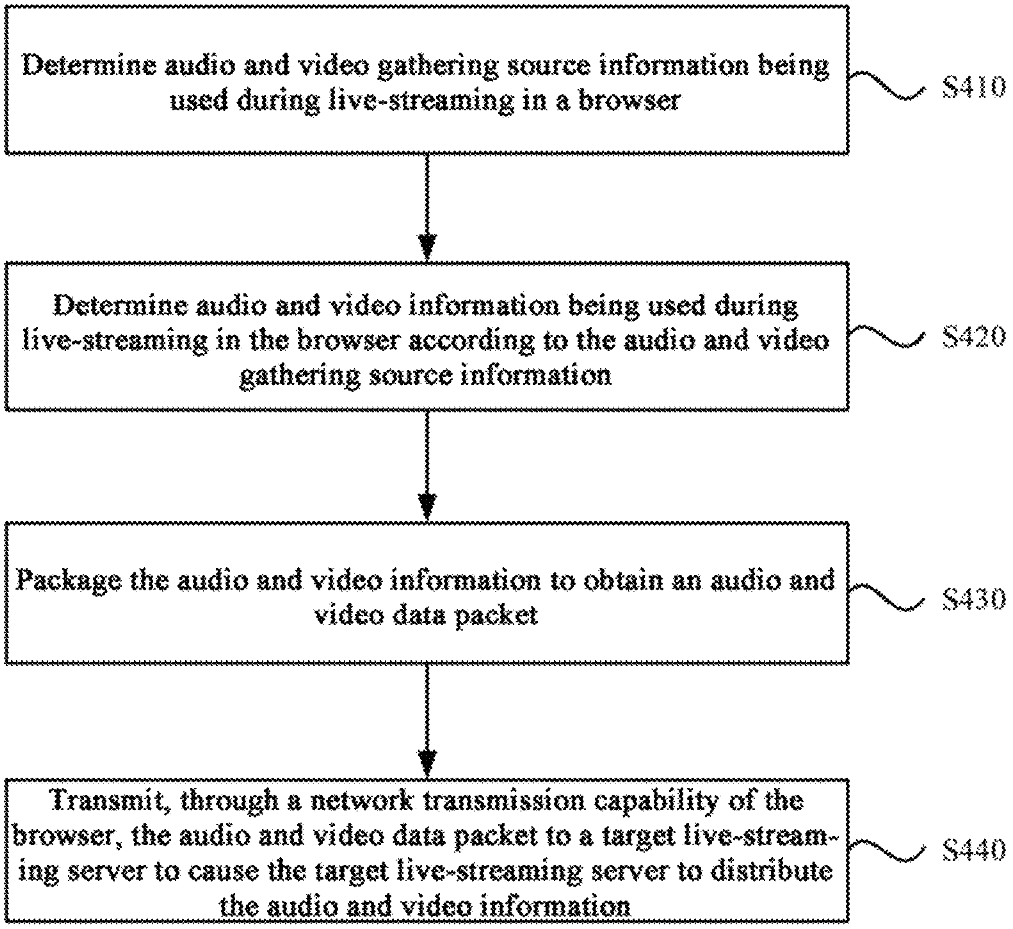
FIG. 4 is a flowchart of another live-streaming method according to an embodiment of the present disclosure.

FIG. 4 is a flowchart of another live-streaming method according to an embodiment of the present disclosure. This embodiment of the present disclosure will detail the foregoing embodiment based on the above embodiment. This embodiment of the present disclosure can be combined with the plurality of solutions in the one or more embodiments. This embodiment of the present disclosure is applicable to a situation for live-streaming in a browser. The method can be performed by a live-streaming apparatus. The apparatus can be implemented in the form of software and/or hardware. For example, the apparatus is implemented through an electronic device. The electronic device can be a mobile terminal, a personal computer (PC) end, a server, or the like. As shown in FIG. 4, the method provided in this embodiment of the present disclosure may include, but not limited to step S410 to step S440 below:

S410. Audio and video gathering source information being used during live-streaming in a browser is determined.

Figure 5:
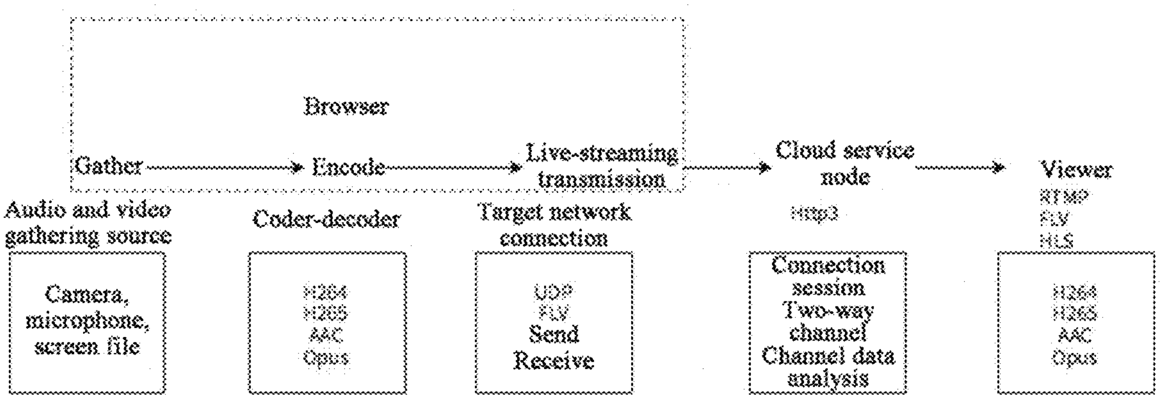
FIG. 5 is a schematic diagram of a live-streaming method according to an embodiment of the present disclosure.

Referring to FIG. 5, the entire process of gathering, encoding, packaging, and live-streaming pushing of the audio and video information is completed in the browser. The audio and video information can be obtained in real time from a camera, a microphone, or a file.

As an exemplary implementation, audio and video gathering source information being used during live-streaming in the browser is determined, which includes:

In response to an audio and video selection event triggered on a browser live-streaming pushing tool, the audio and video gathering source information being used during live-streaming in the browser is determined.

The audio and video selection event includes a selection operation result of an audio source and a video frame source that are displayed and provided by the browser live-streaming pushing tool.

As an exemplary implementation, the selection of the audio and video gathering source includes real-time audio and video gathering, audio and video sharing, and audio and video adding.

Figure 6:
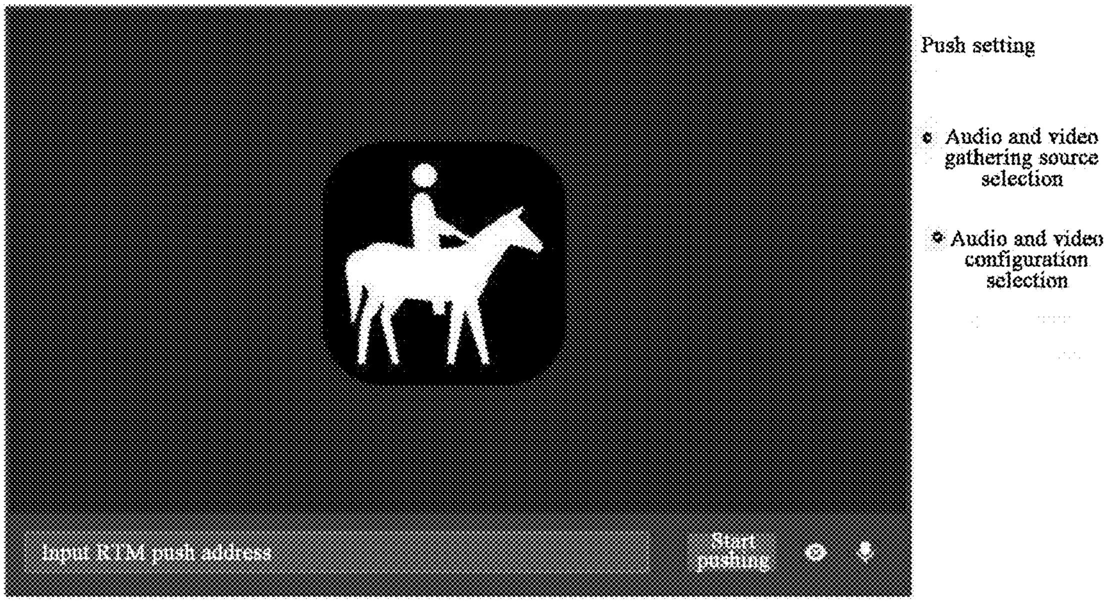
FIG. 6 is a schematic structural diagram of a browser live-streaming pushing tool according to an embodiment of the present disclosure.
Figure 7A:
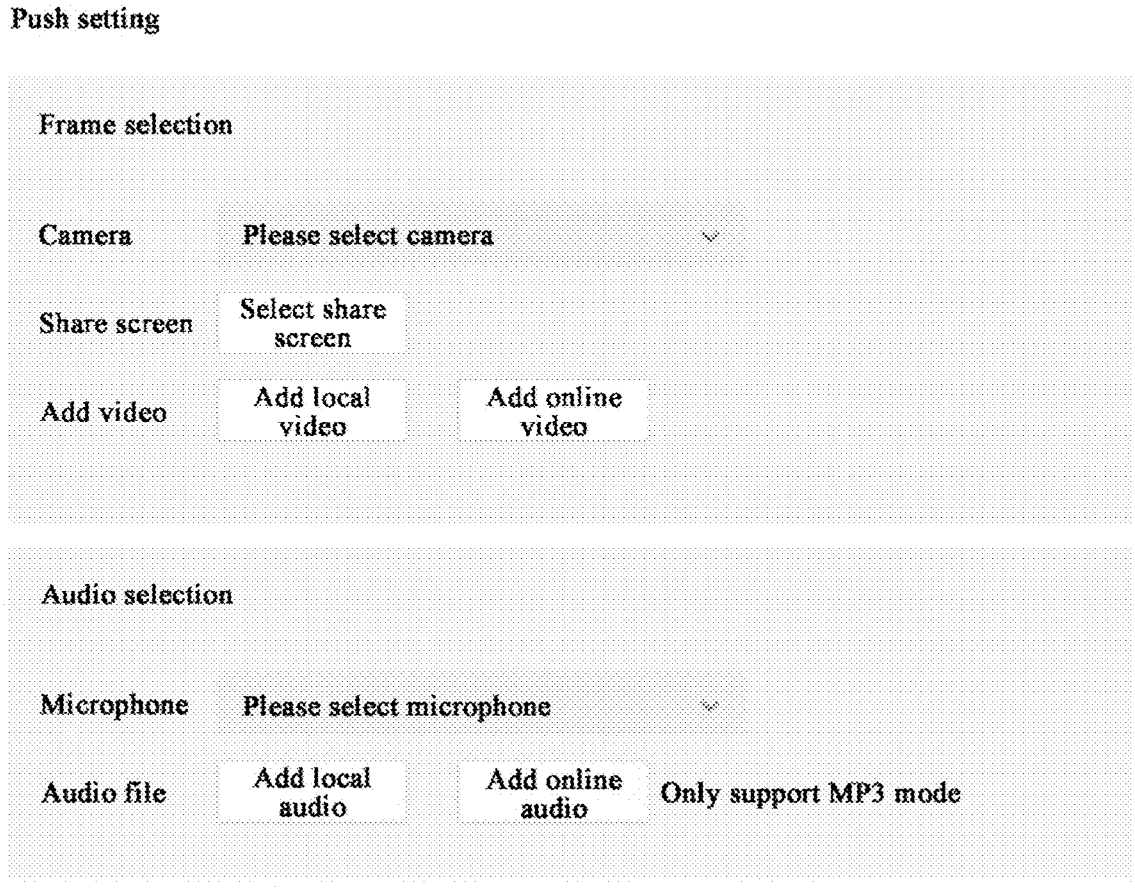
FIG. 7A is a schematic diagram of selection of an audio and video source according to an embodiment of the present disclosure.

Referring to FIG. 6, a live-streaming pushing setting includes, but is not limited to, audio and video gathering source selection and audio and video configuration selection. Referring to FIG. 7A, the audio and video gathering source selection includes a frame selection window and an audio selection window. The frame selection window is configured with a camera selection control, a screen sharing control, and a video adding control. The audio and video configuration selection window is configured with a microphone selection control and a sound mixing file selection control. By selection performed on the controls in the frame selection window and the audio selection window; the audio and video gathering source information being used during the live-streaming in the browser is determined.

Figure 7B:
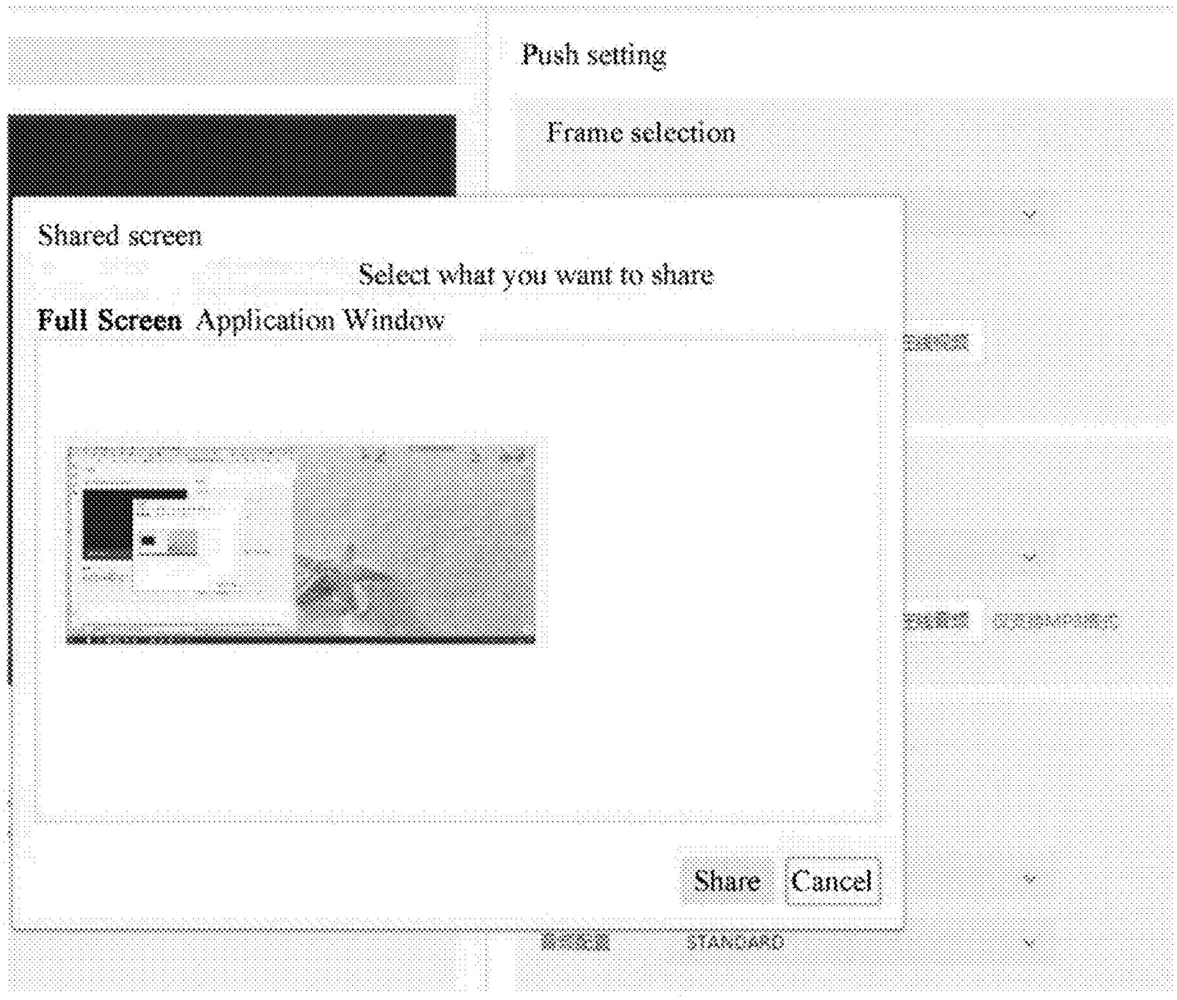
FIG. 7B is a schematic diagram of sharing a selected frame through a screen according to an embodiment of the present disclosure.

In an example solution of this embodiment of the present disclosure, selection of a frame through the screen sharing control is taken as an example. Referring to FIG. 7B, the screen is shared by clicking on button "Select share screen" in the screen sharing control as a live-streaming frame.

Figure 7C:
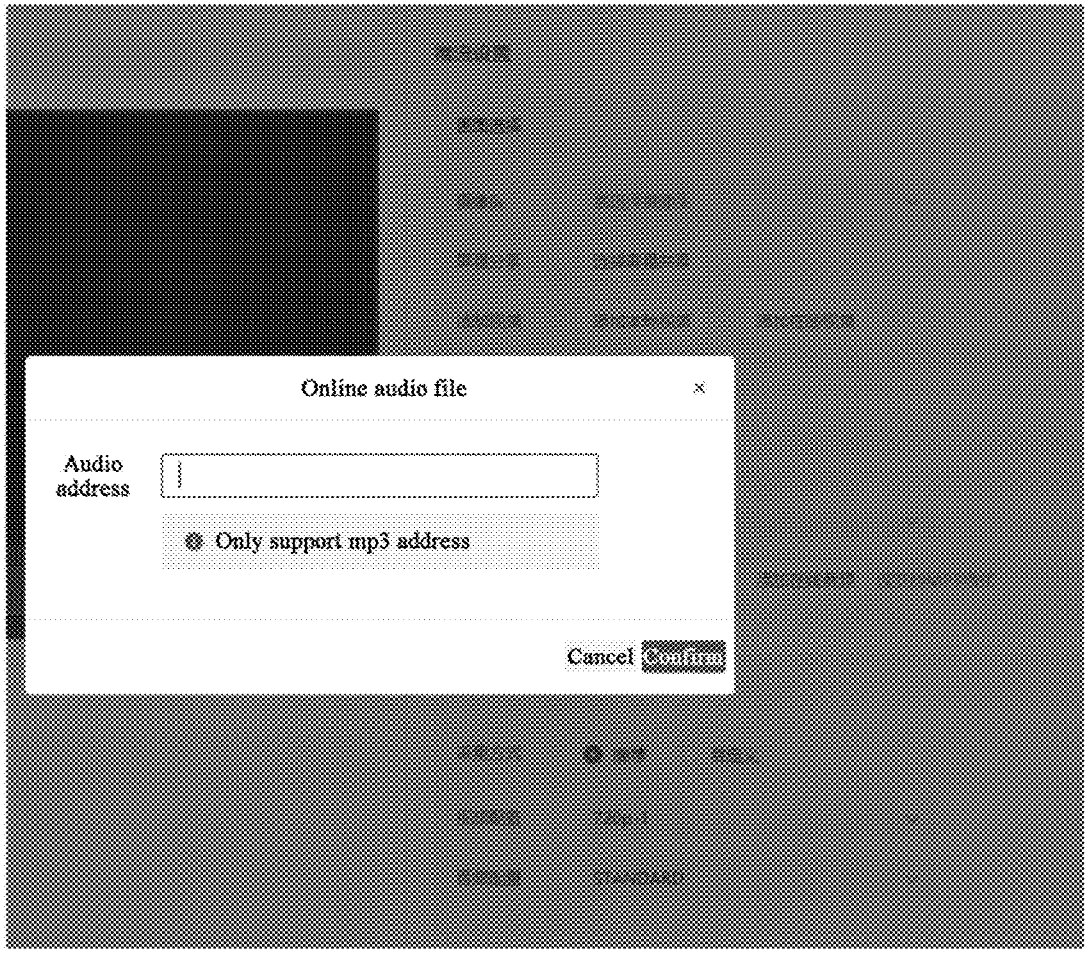
FIG. 7C is a schematic diagram of adding online audios and selecting audios according to an embodiment of the present disclosure.

In another example solution of this embodiment of the present disclosure, selection of an audio through the mixing file selection control is taken as an example. Referring to FIG. 7C, button "Add Online Audio" in the mixing file selection control is clicked on; an audio address is entered; and an online audio will be used as a live-streaming audio.

S420. Audio and video information being used during live-streaming in the browser is determined according to the audio and video gathering source information.

As an exemplary implementation, audio and video information being used during live-streaming in the browser is determined according to the audio and video gathering source information, which includes step A1 to step A3:

Step A1: Audio and video configuration information being used during live-streaming in the browser is determined.

Step A2: Audio and video devices configured to provide audio and video data are determined according to the audio and video gathering source information, and audio and video frames output by the audio and video devices are obtained.

Step A3: Audio and video encoding is performed, according to the audio and video configuration information, on the audio and video frames output by the audio and video devices, to obtain the audio and video information being used during live-streaming in the browser.

Figure 8:
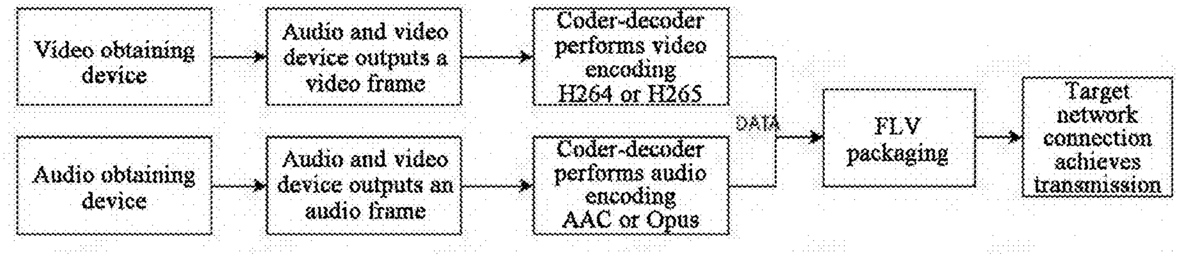
FIG. 8 is a flowchart of determining audio and video information according to audio and video gathering source information according to an embodiment of the present disclosure.

Referring to FIG. 8, the audio and video devices being used during the live-streaming in the browser, and the audio and video frames output by the audio and video devices are determined. The audio and video frames output by the audio and video devices are encoded to obtain the audio and video information being used during the live-streaming in the browser.

As an exemplary implementation, audio and video encoding is performed on the audio and video frames output by the audio and video devices, which includes:

The audio and video encoding is performed, through a webpage audio and video coder-decoder on the browser, on the audio and video frames output by the audio and video devices.

In an example solution of this embodiment of the present disclosure, the audio and video frames output by the audio and video devices can be encoded through the webpage audio and video coder-decoder on the browser. Encoding modes for the video frame include but are not limited to H264 and H265. Encoding modes for the audio frame include but are not limited to Advanced Audio Coding (AAC) and Opus.

As an exemplary implementation, audio and video configuration information being used during live-streaming in the browser is determined, which includes:

In response to an audio and video configuration event triggered on a browser live-streaming pushing tool, the audio and video configuration information being used during live-streaming in the browser is determined.

The audio and video configuration event includes a selection operation result of an audio configuration parameter and a video configuration parameter that are displayed and provided by the browser live-streaming pushing tool.

Figure 9:
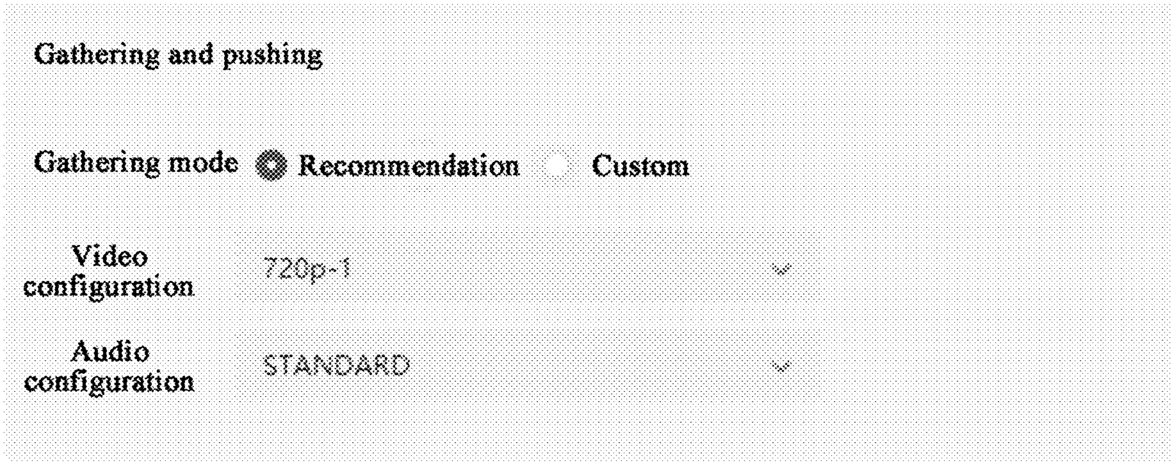
FIG. 9 is a schematic diagram of configuring an audio configuration parameter and a video configuration parameter by using a fixed recommendation configuration mode according to an embodiment of the present disclosure.

Referring to FIG. 9, the audio and video configuration parameters are selected on the browser live-streaming pushing tool to determine the audio and video configuration information during the live-streaming in the browser. For example, a configuration parameter of 720P-1 is selected from the video configuration parameter, and a STANDARD configuration parameter is selected from the audio configuration parameter, namely, the audio and video configuration information during the live-streaming in the browser is determined as a high-definition video configuration and a general audio configuration.

As an exemplary implementation, the audio configuration parameter and the video configuration parameter are determined based on a fixed recommendation configuration mode or a custom configuration mode; the audio configuration parameter is represented by an audio coding rate and an audio sampling rate; and the video configuration parameter is represented by a video resolution, a video coding rate, and a video frame rate.

The audio configuration parameter and the video configuration parameter can be configured by selecting the fixed recommendation configuration mode or the custom configuration mode.

In an example solution provided in this embodiment of the present disclosure, the audio configuration parameter and the video configuration parameter of the audio and video information are set based on the fixed recommendation configuration mode. The video configuration parameter in fixed recommendation is directly set in the form of video definition. For example, the video configuration parameter includes but is not limited to 360P, 480P, and 720P. The definition of video information can be directly defined by selecting the video configuration parameter. The audio configuration parameter in fixed recommendation includes but is not limited to general sound quality and ultra-high sound quality. The audio configuration parameter is set according to a need during the live-streaming in the browser.

Figure 10:
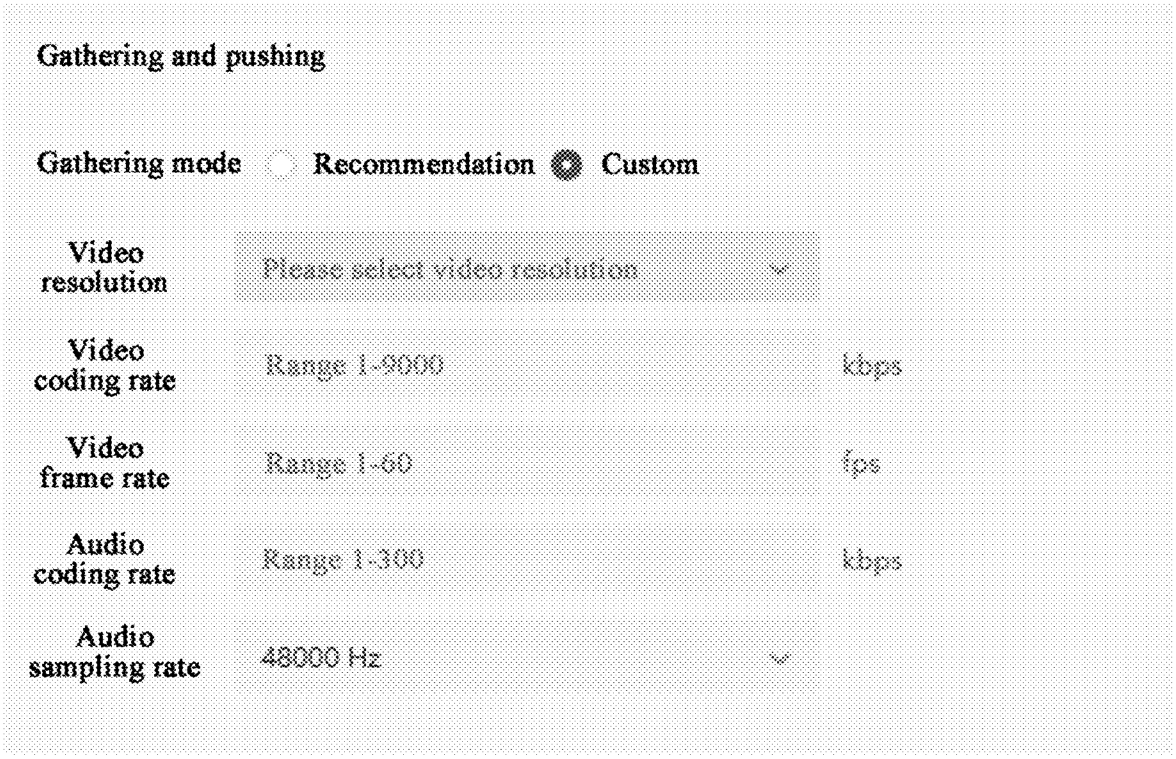
FIG. 10 is a schematic diagram of configuring an audio configuration parameter and a video configuration parameter by using a custom configuration mode according to an embodiment of the present disclosure.

In another example solution provided in this embodiment of the present disclosure, the audio and video configuration parameters can be further set based on the custom configuration mode. For example, referring to FIG. 10, the video configuration parameter can be set based on a video resolution, a video coding rate, and a video frame rate, and the audio configuration parameter can be set based on an audio coding rate and an audio sampling rate.

- S430. The audio and video information is packaged to obtain an audio and video data packet.
- S440. The audio and video data packet is transmitted, through a network transmission capability of the browser, to a target live-streaming server to cause the target live-streaming server to distribute the audio and video information.

According to the live-streaming method provided in this embodiment of the present disclosure, audio and video gathering source information being used during live-streaming in a browser is determined; audio and video information being used during the live-streaming in the browser is determined according to the audio and video gathering source information; the audio and video information is packaged to obtain an audio and video data packet; and the audio and video data packet is transmitted, through a network transmission capability of the browser, to a target live-streaming server to cause the target live-streaming server to distribute the audio and video information. By use of the technical solution of this embodiment of the present disclosure, the audio and video information is obtained based on the real time audio and video gathering, audio and video sharing, or audio and video adding. The audio and video information is encoded and is packaged into the audio and video data packet using a data format FLV. The audio and video data packet is then transmitted to the target live-streaming server through WebTransport. The target live-streaming server receives live-streamer data and forwards the data to viewers. The entire process does not involve audio and video transcoding, thereby avoiding high transcoding cost, potential stability risk, inability to improve the quality, and the like.

Figure 11:
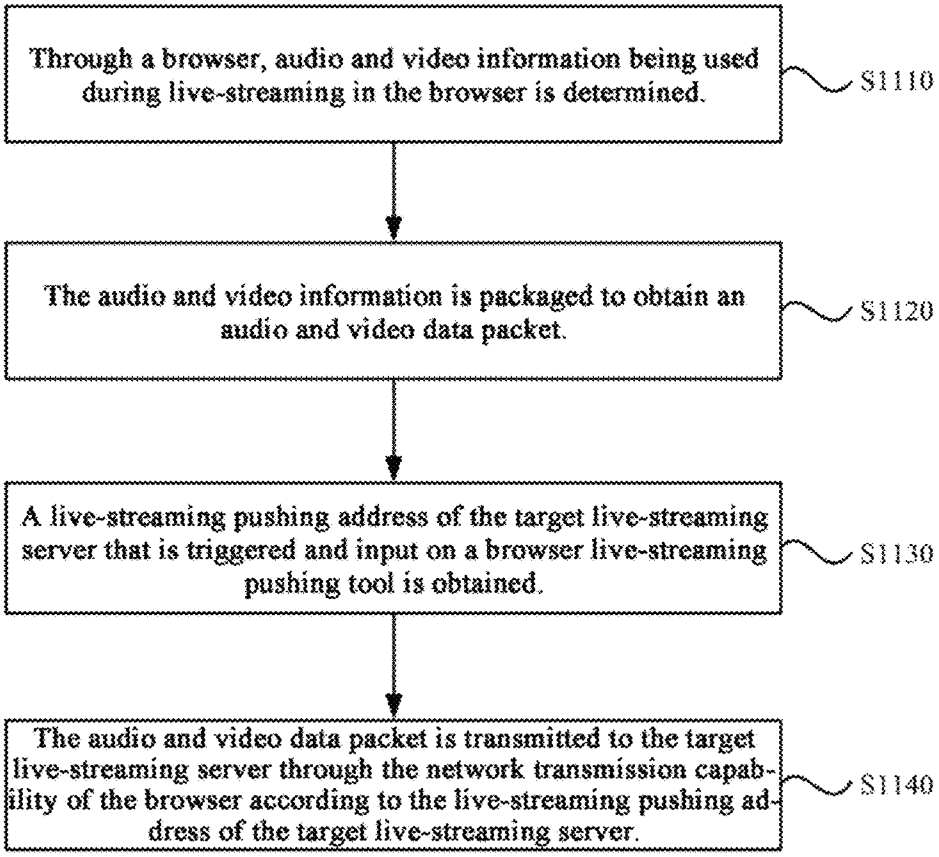
FIG. 11 is a flowchart of still another live-streaming method according to an embodiment of the present disclosure.

FIG. 11 is a flowchart of still another live-streaming method according to an embodiment of the present disclosure. This embodiment of the present disclosure will detail the foregoing embodiment based on the above embodiment. This embodiment of the present disclosure can be combined with the plurality of solutions in the one or more embodiments. This embodiment of the present disclosure is applicable to a situation for live-streaming in a browser. The method can be performed by a live-streaming apparatus. The apparatus can be implemented in the form of software and/or hardware. For example, the apparatus is implemented through an electronic device. The electronic device can be a mobile terminal, a personal computer (PC) end, a server, or the like. The method includes but is not limited to step S1110 to step S1140:

- S1110. Through a browser, audio and video information being used during live-streaming in the browser is determined.
- S1120. The audio and video information is packaged to obtain an audio and video data packet.

As an exemplary implementation, the audio and video information is packaged to obtain an audio and video data packet, which includes step B1 to step B2:

- Step B1: A target data format required for packaging the audio and video information is determined.
- Step B2: The audio and video information is packaged according to the target data format to obtain the audio and video data packet. The target data format is a fixed configuration or a custom configuration.

Since the browser has stopped supporting the Flash function, major video websites including You Tube have gradually switched to Flash Video (FLV) protocol, HTTP Live Streaming (HLS) protocol, and the like. Therefore, the target data format in this solution may include but is not limited to an FLV data format, am HLS data format, and the like. When the FLV data format and the HLS data format are used, they can be used according to original fixed configurations of the FLV data format and the HLS data format, or are used after performing personalized custom configuration based on the FLV data format and the HLS data format, thereby achieving optimization and transmission on the transmitted data according to an actual need; the audio and video information is packaged in the FLV data format to obtain the audio and video data packet.

- S1130. A live-streaming pushing address of the target live-streaming server that is triggered and input on a browser live-streaming pushing tool is obtained.

The live-streaming pushing can be a process of transmitting the packaged audio and video data packet to the target live-streaming server. By the live-streaming pushing, the audio and video information can be distributed to more users to increase the page view of the audio and video information. Referring to FIG. 6, the live-streaming pushing address is entered into a live-streaming address window. Button "Start" is clicked on, and the packaged audio and video information is transmitted to the target live-streaming server through the network transmission capability.

S1140. The audio and video data packet is transmitted to the target live-streaming server through the network transmission capability of the browser according to the live-streaming pushing address of the target live-streaming server.

As an exemplary implementation, the audio and video data packet is transmitted, through a network transmission capability of the browser, to a target live-streaming server, which includes:

The audio and video data packet obtained by packaging the audio and video information is transmitted to the target live-streaming server through a target network connection established between the browser and the target live-streaming server.

The target network connection is established depending on the network transmission capability of the browser, for example, depending on a JavaScript API with the network transmission capability provided by the browser such as WebTransport.

Figure 12:
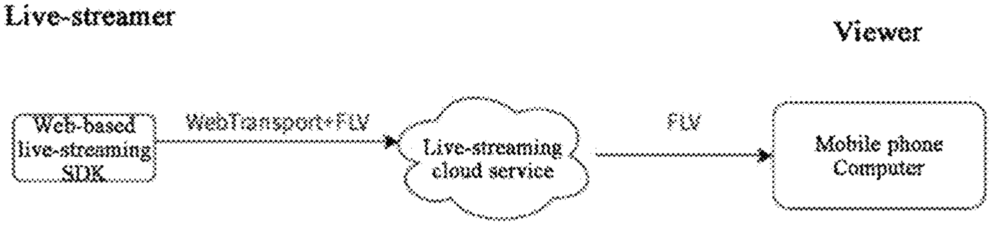
FIG. 12 is a schematic diagram of a principle of live-streaming in a browser according to an embodiment of the present disclosure.

Referring to FIG. 12, this embodiment provides a software development kit for Web-based live-streaming, which can be directly connected to a live-streaming cloud service. A stream of a live-streamer can be distributed to viewers at high quality. The software development kit for Web-based live-streaming utilizes the JavaScript API provided by the browser such as WebModec and WebTransport to implement the entire process of gathering, encoding, packaging, and live-streaming pushing. In the browser live-streaming solution provided in this embodiment of the present disclosure, the live-streaming pushing link is simple. Web-based live-streaming is achieved by one click, which is simple and convenient.

As an exemplary implementation, the target live-streaming server can perform the target network connection to the browser based on a Hyper Text Transmission Protocol-3 (HTTP3) by expanding a QUIC-GO library, and can provide support for identifying audios and videos, which are transmitted by the browser, in the target data format.

In this embodiment, WebTransport is used to connect the browser with the target live-streaming server to achieve the distribution of the audio and video information. The target live-streaming server expands the QUIC-GO library to support WebTransport connection based on the HTTP3. To establish the connection to WebTransport, the client/server needs to set ENABLE_WEBTRANSPORT to 1 when transmitting SETTINGS frame (rfc9114 7.2.4). If ENABLE_WEBTRANSPORT is a value other than 0/1, the other end needs to return H3_SETTINGS_ERROR.

As an exemplary implementation, before the audio and video data packet is transmitted to the target live-streaming server, the method further includes:

An expanded communication connection request is initiated to the target live-streaming server, to cause the target live-streaming server to establish the target network connection with the browser after a preset field carried in the communication connection request has been verified.

The preset field includes a protocol pseudo header field, a scheme field, an authority field, and a path field.

To create a WebTransport session, the client needs to initiate an HTTP CONNECT request. The protocol pseudo header field needs to be set to webtransport (HTTP protocol upgrade); the scheme field needs to be https; the authority and path fields need to be set to indicate a desired WebTransport server; and an Origin field needs to be provided in the header. When the server receives an HTTP CONNECT expansion request, the HTTP3 server can check the authority field and the path field. The Origin header is configured to reply with 404 (no relevant service) or 2xx (Upgrade is completed. To receive session). Sending or receiving CLOSE_WEBTRANSPORT_SESSION capsule is considered as terminating a session. In this embodiment of the present disclosure, the browser is connected to the live-streaming cloud service WebTransport through the software development kit in the browser, and the stream of the live-streamer is distributed to more users for viewing. The entire process does not involve audio and video transcoding, thereby avoiding a situation where WebRTC can only push Opus audios to increase the transcoding cost. By the expansion of the encoding mode, H265 videos can be supported, and QoS can be improved.

Figure 13:
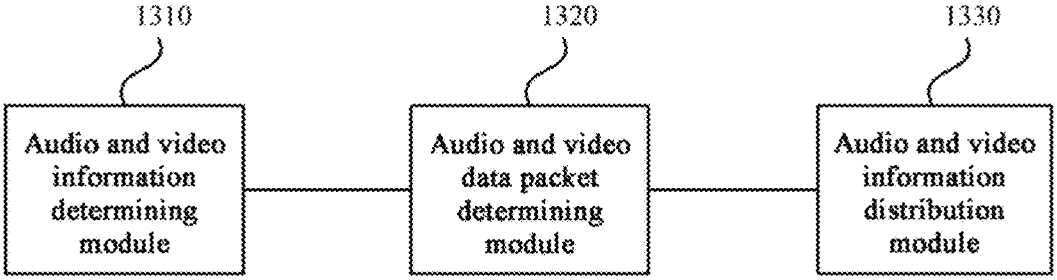
FIG. 13 is a schematic structural diagram of a live-streaming apparatus according to an embodiment of the present disclosure.

FIG. 13 is a schematic structural diagram of a live-streaming apparatus according to an embodiment of the present disclosure. As shown in FIG. 13, the apparatus includes an audio and video information determining module 1310, an audio and video data packet determining module 1320, and an audio and video information distribution module 1330. Where the audio and video information determining module 1310 is configured to determine, through a browser, audio and video information being used during live-streaming in the browser;

the audio and video data packet determining module 1320 is configured to package the audio and video information to obtain an audio and video data packet; and the audio and video information distribution module 1330 is configured to: transmit, through a network transmission capability of the browser, the audio and video data packet to a target live-streaming server to cause the target live-streaming server to distribute the audio and video information.

Based on the above embodiment, the audio and video information determining module is configured to:

determine audio and video gathering source information being used during live-streaming in the browser; and determine, according to the audio and video gathering source information, audio and video information being used during live-streaming in the browser.

Based on the above embodiment, the audio and video information determining module is further configured to:

in response to an audio and video selection event triggered on a browser live-streaming pushing tool, determine the audio and video gathering source information being used during live-streaming in the browser.

The audio and video selection event includes a selection operation result of an audio source and a video frame source that are displayed and provided by the browser live-streaming pushing tool.

Based on the above embodiment, the audio and video information determining module is further configured to:

The selection of the audio and video gathering source includes real-time audio and video gathering, audio and video sharing, and audio and video adding.

Based on the above embodiment, the audio and video information determining module is further configured to:

determine audio and video configuration information being used during live-streaming in the browser;

determine, according to the audio and video gathering source information, audio and video devices configured to provide audio and video data, and obtaining audio and video frames output by the audio and video devices; and perform, according to the audio and video configuration information, audio and video encoding on the audio and video frames output by the audio and video devices, to obtain the audio and video information being used during live-streaming in the browser.

Based on the above embodiment, the audio and video information determining module is further configured to:

perform the audio and video encoding, through a webpage audio and video coder-decoder on the browser, on the audio and video frames output by the audio and video devices.

Based on the above embodiment, the audio and video information determining module is further configured to:

in response to an audio and video configuration event triggered on a browser live-streaming pushing tool, determine the audio and video configuration information being used during live-streaming in the browser.

The audio and video configuration event includes a selection operation result of an audio configuration parameter and a video configuration parameter that are displayed and provided by the browser live-streaming pushing tool.

Based on the above embodiment, the audio and video information determining module is further configured to:

determine the audio configuration parameter and the video configuration parameter based on a fixed recommendation configuration mode or a custom configuration mode. The audio configuration parameter is represented by an audio coding rate and an audio sampling rate; and the video configuration parameter is represented by a video resolution, a video coding rate, and a video frame rate.

Based on the above embodiment, the audio and video data packet determining module is configured to:

determine a target data format required for packaging the audio and video information; and package the audio and video information according to the target data format to obtain the audio and video data packet, wherein the target data format is a fixed configuration or a custom configuration.

Based on the above embodiment, the audio and video information distribution module is configured to:

obtain a live-streaming pushing address of the target live-streaming server that is triggered and input on a browser live-streaming pushing tool; and transmit the audio and video data packet to the target live-streaming server through the network transmission capability of the browser according to the live-streaming pushing address of the target live-streaming server.

Based on the above embodiment, the audio and video information distribution module is further configured to:

transmit, through a target network connection established between the browser and the target live-streaming server, the audio and video data packet obtained by packaging the audio and video information to the target live-streaming server, wherein the target network connection is established depending on the network transmission capability of the browser.

Based on the above embodiment, the audio and video information distribution module is further configured to:

the target live-streaming server can perform the target network connection to the browser based on an HTTP3 by expanding a QUIC-GO library in advance, and can provide support for identifying audios and videos, which are transmitted by the browser, in the target data format.

Based on the above embodiment, the audio and video information distribution module is further configured to:

initiate an expanded communication connection request to the target live-streaming server, to cause the target live-streaming server to establish the target network connection with the browser after a preset field carried in the communication connection request has been verified.

The preset field includes a protocol pseudo header field, a scheme field, an authority field, and a path field.

The live-streaming apparatus provided in this embodiment of the present disclosure can implement the live-streaming method provided in any embodiment of the present disclosure, and includes corresponding functional modules for implementing the method and corresponding beneficial effects.

It is worth noting that the plurality of units and modules included in the above apparatus are only divided according to a functional logic, but are not limited to the above division, as long as the corresponding functions can be achieved. In addition, the specific names of the plurality of functional units are only for the purpose of distinguishing and are not used to limit the protection scope of the embodiments of the present disclosure.

Figure 14:
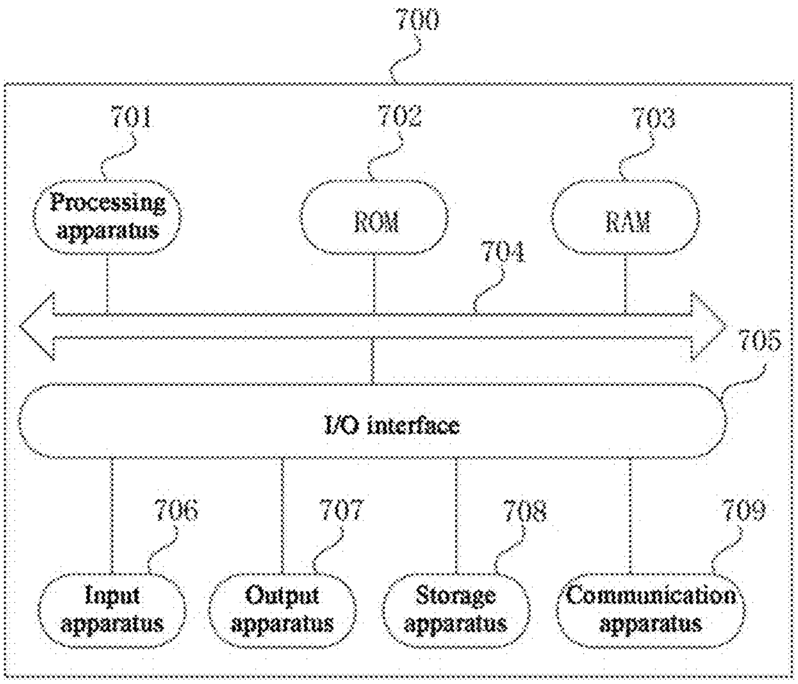
FIG. 14 is a schematic structural diagram of an electronic device according to the embodiments of the present disclosure.

FIG. 14 is a schematic structural diagram of an electronic device according to the embodiments of the present disclosure. Reference is now made to FIG. 14 below, which illustrates a schematic structural diagram of an electronic device (namely, a terminal device or a server in FIG. 14) 700 suitable for implementing an embodiment of the present disclosure. The terminal device in the embodiments of the present disclosure may include, but is not limited to, a mobile phone, a laptop, a digital broadcast receiver, a Personal Digital Assistant (PDA), a Portable Android Device (PAD), a Portable Media Player (PMP), a mobile terminal such as a vehicle-mounted terminal (for example, a vehicle-mounted navigation terminal), and a fixed terminal such as digital television (TV) and a desktop computer. The electronic device shown in FIG. 14 is only an example and should not impose any limitations on the functionality and scope of use of the embodiments of the present disclosure.

As shown in FIG. 14, the electronic device 700 may include a processing apparatus (such as a central processing unit and graphics processing unit) 701 that can perform various appropriate actions and processing according to programs stored in a ROM 702 or loaded from a storage apparatus 708 to a RAM 703. Various programs and data required for operations of the electronic device 700 may also be stored in the RAM 703. The processing apparatus 701, the ROM 702, and the RAM 703 are connected to each other through a bus 704. An Input/Output (I/O) interface 705 is also connected to the bus 704.

Usually, following apparatuses can be connected to the I/O interface 705; an input apparatus 706 including a touch screen, a touchpad, a keyboard, a mouse, a camera, a microphone, an accelerometer, a gyroscope, and the like; an output apparatus 707 including a Liquid Crystal Display (LCD), a speaker, a vibrator, and the like; a storage apparatus 708 including a magnetic tape, a hard disk drive, and the like; and a communication apparatus 709. The communication apparatus 709 can allow the electronic device 700 to wirelessly or wiredly communicate with other devices to exchange data. Although FIG. 14 shows the electronic device 700 with multiple apparatuses, it should be understood that the electronic device 700 is not required to implement or have all the apparatuses shown, and can alternatively implement or have more or fewer apparatuses.

According to the embodiments of the present disclosure, the process described in the reference flowchart above can be implemented as a computer software program. For example, the embodiments of the present disclosure include a computer program product, including a computer program carried on a non-transitory computer-readable medium, and the computer program includes program codes used for performing the methods shown in the flowcharts. In such an embodiment, the computer program may be downloaded and installed from a network through the communication apparatus 709, or installed from the memory 708, or installed from the ROM 702. When the computer program is executed by the processing apparatus 701, the above-mentioned functions defined in the methods of the embodiments of the present disclosure are executed.

Messages or names of information interacted between a plurality of apparatuses in the implementations of the present disclosure are only for illustrative purposes and are not intended to limit the messages or the scope of the information.

The electronic device provided in this embodiment of the present disclosure and the live-streaming method provided in the above embodiment belong to the same concept. Technical details not fully described in this embodiment can be found in the above embodiment, and this embodiment has the same effects as the above embodiment.

The embodiments of the present disclosure provide a computer storage medium having a computer program stored thereon. Running of the program by a processor implements the live-streaming method provided in the above embodiment.

It should be noted that the computer-readable medium mentioned in the present disclosure can be a computer-readable signal medium, a computer-readable storage medium, or any combination of the computer-readable signal medium and the computer-readable storage medium. The computer-readable storage medium can be, for example, but not limited to, electric, magnetic, optical, electromagnetic, infrared, or semiconductor systems, apparatuses, or devices, or any combination of the above. More specific examples of the computer-readable storage medium may include, but are not limited to; an electrical connection with one or more wires, a portable computer disk, a hard disk drive, a RAM, a ROM, an Erasable Programmable Read Only Memory (EPROM) or flash memory, an optical fiber, a Compact Disc Read-Only Memory (CD-ROM), an optical storage device, a magnetic storage device, or any suitable combination of the above. In the present disclosure, the computer-readable storage medium may be any tangible medium that contains or stores a program, and the program can be used by or in combination with an instruction execution system, apparatus, or device. In the present disclosure, the computer-readable signal media may include data signals propagated in a baseband or as part of a carrier wave, which carries computer-readable program codes. The propagated data signals can be in various forms, including but not limited to: electromagnetic signals, optical signals, or any suitable combination of the above. The computer-readable signal medium may also be any computer-readable medium other than a computer-readable storage medium. The computer-readable signal medium can send, propagate, or transmit programs for use by or in combination with an instruction execution system, apparatus, or device. The program codes contained in the computer-readable medium can be transmitted using any suitable medium, including but are not limited to: a wire, an optical cable, a Radio Frequency (RF), and the like, or any suitable combination of the above.

In some implementations, clients and servers can communicate using any currently known or future developed network protocol such as a HyperText Transfer Protocol (HTTP), and can intercommunicate and be interconnected with digital data in any form or medium (for example, a communication network). Examples of the communication network include a Local Area Network (LAN), a Wide Area Network (WAN), an internet (such as an Internet), a point-to-point network (such as an ad hoc point-to-point network, and any currently known or future developed network.

The computer-readable medium may be included in the electronic device or exist alone and is not assembled into the electronic device.

The above computer-readable medium carries one or more programs. When the one or more programs are run by the electronic device, the electronic device is caused to: determine, through a browser, audio and video information being used during live-streaming in the browser; package the audio and video information to obtain an audio and video data packet; and transmit, through a network transmission capability of the browser, the audio and video data packet to a target live-streaming server to cause the target live-streaming server to distribute the audio and video information.

Computer program codes for performing the operations of the present disclosure may be written in one or more programming languages or a combination thereof. The above programming languages include but are not limited to an object-oriented programming language such as Java, Smalltalk, and C++, and conventional procedural programming languages such as "C" language or similar programming languages. The program codes may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a LAN or a WAN, or can be connected to an external computer (for example, through an Internet using an Internet service provider).

The flowcharts and block diagrams in the accompanying drawings illustrate possible system architectures, functions, and operations that may be implemented by a system, a method, and a computer program product according to various embodiments of the present disclosure. In this regard, each block in a flowchart or a block diagram may represent a module, a program, or a part of a code. The module, the program, or the part of the code includes one or more executable instructions used for implementing specified logic functions. In some implementations used as substitutes, functions annotated in blocks may alternatively occur in a sequence different from that annotated in an accompanying drawing. For example, actually two blocks shown in succession may be performed basically in parallel, and sometimes the two blocks may be performed in a reverse sequence. This is determined by a related function. It is also be noted that each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

The units described in the embodiments of the present disclosure can be implemented through software or hardware. The name of the unit does not constitute a limitation on the unit itself. For example, the first obtaining unit can also be described as "a unit that obtains at least two Internet protocol addresses".

The functions described herein above may be performed, at least in part, by one or a plurality of hardware logic components. For example, nonrestrictively, example hardware logic components that can be used include: a Field Programmable Gate Array (FPGA), an Application Specific Integrated Circuit (ASIC), Application Specific Standard Parts (ASSP), a System on Chip (SOC), a Complex Programmable Logic Device (CPLD), and the like.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable medium may include an electrical connection based on one or more wires, a portable computer disk, a hard disk drive, a RAM, a ROM, an EPROM or flash memory, an optical fiber, a CD-ROM, an optical storage device, a magnetic storage device, or any suitable combinations of the above contents.

According to one or more embodiments of the present disclosure, Example 1 provides a live-streaming method. The method includes:

- determining, through a browser, audio and video information being used during live-streaming in the browser;
- packaging the audio and video information to obtain an audio and video data packet; and
- transmitting, through a network transmission capability of the browser, the audio and video data packet to a target live-streaming server to cause the target live-streaming server to distribute the audio and video information.

In Example 2, according to the method of Example 1, determining, through a browser, audio and video information being used during live-streaming in the browser includes:

- determining audio and video gathering source information being used during live-streaming in the browser; and
- determining, according to the audio and video gathering source information, audio and video information being used during live-streaming in the browser.

In Example 3, according to the method of Example 2, determining audio and video gathering source information being used during live-streaming in the browser includes:

- in response to an audio and video selection event triggered on a browser live-streaming pushing tool, determining the audio and video gathering source information being used during live-streaming in the browser.

The audio and video selection event includes a selection operation result of an audio source and a video frame source that are displayed and provided by the browser live-streaming pushing tool.

In Example 4, according to the method of Example 2, the audio and video information is determined based on one of the following modes: real-time audio and video gathering, audio and video sharing, and audio and video adding.

In Example 5, according to the method of Example 2, determining, according to the audio and video gathering source information, audio and video information being used during live-streaming in the browser includes

- determining audio and video configuration information being used during live-streaming in the browser;
- determining, according to the audio and video gathering source information, audio and video devices configured to provide audio and video data, and obtaining audio and video frames output by the audio and video devices; and
- performing, according to the audio and video configuration information, audio and video encoding on the audio and video frames output by the audio and video devices, to obtain the audio and video information being used during live-streaming in the browser.

In Example 6, according to the method of Example 5, performing audio and video encoding on the audio and video frame output by the audio and video device includes:

- performing, through a webpage audio and video coder-decoder on the browser, the audio and video encoding on the audio and video frame output by the audio and video device.

In Example 7, according to the method of Example 5, determining audio and video configuration information being used during live-streaming in the browser includes:

- in response to an audio and video configuration event triggered on a browser live-streaming pushing tool, determining the audio and video configuration information being used during live-streaming in the browser.

The audio and video configuration event includes a selection operation result of an audio configuration parameter and a video configuration parameter that are displayed and provided by the browser live-streaming pushing tool.

In Example 8, according to the method of Example 7, the audio configuration parameter and the video configuration parameter are determined based on a fixed recommendation configuration mode or a custom configuration mode; the audio configuration parameter is represented by an audio coding rate and an audio sampling rate; and the video configuration parameter is represented by a video resolution, a video coding rate, and a video frame rate.

In Example 9, according to the method of Example 1, packaging the audio and video information to obtain an audio and video data packet includes:

- determining a target data format required for packaging the audio and video information; and
- packaging the audio and video information according to the target data format to obtain the audio and video data packet, wherein the target data format is a fixed configuration or a custom configuration.

In Example 10, according to the method of Example 1, transmitting, through a network transmission capability of the browser, the audio and video data packet to a target live-streaming server includes:

obtaining a live-streaming pushing address of the target live-streaming server that is triggered and input on a browser live-streaming pushing tool; and

- transmitting the audio and video data packet to the target live-streaming server through the network transmission capability of the browser according to the live-streaming pushing address of the target live-streaming server.

In Example 11, according to the method of any of Examples 1 to 10, transmitting the audio and video data packet to a target live-streaming server through a network transmission capability of the browser includes:

- transmitting the audio and video data packet to the target live-streaming server through a target network connection established between the browser and the target live-streaming server, wherein the target network connection is established depending on the network transmission capability of the browser.

In Example 12, according to the method of Example 11, the target live-streaming server performs the target network connection to the browser based on an HTTP3 by expanding a QUIC-GO library in advance, and provides support for identifying audios and videos in the target data format that are transmitted by the browser.

In Example 13, according to the method of Example 11, the method further includes, before transmitting the audio and video data packet to the target live-streaming server:

initiating an expanded communication connection request to the target live-streaming server, to cause the target live-streaming server to establish the target network connection with the browser after a preset field carried in the communication connection request has been verified.

According to one or more embodiments of the present disclosure, Example 14 provides a live-streaming apparatus. The apparatus includes:

an audio and video information determining module, configured to determine, through a browser, audio and video information being used during live-streaming in the browser;

an audio and video data packet determining module, configured to package the audio and video information to obtain an audio and video data packet; and an audio and video information distribution module, configured to: transmit, through a network transmission capability of the browser, the audio and video data packet to a target live-streaming server to cause the target live-streaming server to distribute the audio and video information.

According to one or more embodiments of the present disclosure, Example 15 provides an electronic device. The electronic device includes:

one or more processors; and a storage apparatus, configured to store one or more programs.

The one or more programs, when run by the one or more processors, cause the one or more processors to implement the live-streaming method according to any of Examples 1 to 13.

According to one or more embodiments of the present disclosure, Example 16 provides a storage medium including computer-executable instructions. When executed by a computer processor, the computer-executable instructions are used for performing the live-streaming method according to any one of Examples to 1 to 13.

In addition, although various operations are depicted in a specific order, this should not be understood as requiring these operations to be executed in the specific order shown or in a sequential order. In certain environments, multitasking and parallel processing may be advantageous. Similarly, although several specific implementation details are included in the above discussion, these should not be interpreted as limiting the scope of the present disclosure. Some features described in the context of individual embodiments can also be combined and implemented in a single embodiment. On the contrary, various features that are described in the context of the single embodiment may also be implemented in a plurality of embodiments separately or in any suitable sub-combinations.

I claim:

1. A live-streaming method, comprising:

determining, through a browser, audio and video information being used during live-streaming in the browser, the audio and video information comprising first information for audio and video gathering source and second information for audio and video configuration;

packaging, through the browser, the audio and video information to obtain an audio and video data packet; and transmitting, through a network transmission capability of the browser, the audio and video data packet to a target live-streaming server to cause the target live-streaming server to distribute the audio and video information.

2. The method according to claim 1, wherein determining, through the browser, the audio and video information being used during the live-streaming in the browser comprises:

determining the first information for audio and video gathering source being used during the live-streaming in the browser; and determining, according to the first information for audio and video gathering source, the audio and video information being used during the live-streaming in the browser.

3. The method according to claim 2, wherein determining the first information for audio and video gathering source being used during the live-streaming in the browser comprises:

in response to an audio and video selection event triggered on a browser live-streaming pushing tool, determining the first information for audio and video gathering source being used during the live-streaming in the browser, wherein the audio and video selection event comprise a selection operation result of an audio source and a video frame source that are displayed and provided by the browser live-streaming pushing tool.

4. The method according to claim 2, wherein the audio and video information is determined based on one of the following modes: real-time audio and video gathering, audio and video sharing, and audio and video adding.

5. The method according to claim 2, wherein determining, according to the first information for audio and video gathering source, the audio and video information being used during the live-streaming in the browser comprises:

determining the second information for audio and video configuration being used during the live-streaming in the browser;

determining, according to the first information for audio and video gathering source, audio and video devices configured to provide audio and video data, and obtaining audio and video frames output by the audio and video devices; and performing, according to the second information for audio and video configuration, audio and video encoding on the audio and video frames output by the audio and video devices, to obtain the audio and video information being used during the live-streaming in the browser.

6. The method according to claim 5, wherein performing the audio and video encoding on the audio and video frames output by the audio and video devices comprises:

performing, through a webpage audio and video coder-decoder on the browser, the audio and video encoding on the audio and video frames output by the audio and video devices.

7. The method according to claim 5, wherein determining the second information for audio and video configuration being used during the live-streaming in the browser comprises:
in response to an audio and video configuration event triggered on a browser live-streaming pushing tool, determining the second information for audio and video configuration being used during the live-streaming in the browser,
wherein the audio and video configuration event comprise a selection operation result of an audio configuration parameter and a video configuration parameter that are displayed and provided by the browser live-streaming pushing tool.

8. The method according to claim 7, wherein the audio configuration parameter and the video configuration parameter are determined based on a fixed recommendation configuration mode or a custom configuration mode; the audio configuration parameter is represented by an audio coding rate and an audio sampling rate; and the video configuration parameter is represented by a video resolution, a video coding rate, and a video frame rate.

9. The method according to claim 1, wherein packaging, through the browser, the audio and video information to obtain the audio and video data packet comprises:
determining a target data format required for packaging the audio and video information; and
packaging the audio and video information according to the target data format to obtain the audio and video data packet, wherein the target data format is a fixed configuration or a custom configuration.

10. The method according to claim 1, wherein transmitting, through the network transmission capability of the browser, the audio and video data packet to the target live-streaming server comprises:
obtaining a live-streaming pushing address of the target live-streaming server that is triggered and input on a browser live-streaming pushing tool; and
transmitting the audio and video data packet to the target live-streaming server through the network transmission capability of the browser according to the live-streaming pushing address of the target live-streaming server.

11. The method according to claim 1, wherein transmitting the audio and video data packet to the target live-streaming server through the network transmission capability of the browser comprises:
transmitting the audio and video data packet to the target live-streaming server through a target network connection established between the browser and the target live-streaming server, wherein the target network connection is established depending on the network transmission capability of the browser.

12. The method according to claim 11, wherein the target live-streaming server performs the target network connection to the browser based on a Hyper Text Transmission Protocol-3 (HTTP3) by expanding a QUIC-GO library in advance, and provides support for identifying audios and videos, which are transmitted by the browser, in a target data format.

13. The method according to claim 11, wherein the method further comprises, before transmitting the audio and video data packet to the target live-streaming server:
initiating an expanded communication connection request to the target live-streaming server, to cause the target live-streaming server to establish the target network connection with the browser after a preset field carried in the expanded communication connection request has been verified.

14. An electronic device, comprising:
at least one processor; and
a memory communicably connected with the at least one processor, wherein
the memory stores a computer program run by the at least one processor, and the computer program, when run by the at least one processor, causes the at least one processor to implement a live-streaming method comprising:
determining, through a browser, audio and video information being used during live-streaming in the browser, the audio and video information comprising first information for audio and video gathering source and second information for audio and video configuration;
packaging, through the browser, the audio and video information to obtain an audio and video data packet; and
transmitting, through a network transmission capability of the browser, the audio and video data packet to a target live-streaming server to cause the target live-streaming server to distribute the audio and video information.

15. A non-transitory computer-readable storage medium having computer instructions stored thereon, wherein when executed by a processor, the computer instructions are used for implementing a live-streaming comprising:
determining, through a browser, audio and video information being used during the live-streaming in the browser, the audio and video information comprising first information for audio and video gathering source and second information for audio and video configuration;
packaging, through the browser, the audio and video information to obtain an audio and video data packet; and
transmitting, through a network transmission capability of the browser, the audio and video data packet to a target live-streaming server to cause the target live-streaming server to distribute the audio and video information.

16. The electronic device according to claim 14, wherein determining, through the browser, the audio and video information being used during the live-streaming in the browser comprises:
determining the first information for audio and video gathering source being used during the live-streaming in the browser; and
determining, according to the first information for audio and video gathering source, the audio and video information being used during the live-streaming in the browser.

17. The electronic device according to claim 16, wherein determining the first information for audio and video gathering source being used during the live-streaming in the browser comprises:
in response to an audio and video selection event triggered on a browser live-streaming pushing tool, determining the first information for audio and video gathering source being used during the live-streaming in the browser,
wherein the audio and video selection event comprise a selection operation result of an audio source and a video frame source that are displayed and provided by the browser live-streaming pushing tool.

18. The electronic device according to claim 16, wherein the audio and video information is determined based on one of the following modes: real-time audio and video gathering, audio and video sharing, and audio and video adding.

19. The electronic device according to claim 16, wherein determining, according to the first information for audio and video gathering source, the audio and video information being used during the live-streaming in the browser comprises:

determining the second information for audio and video configuration being used during the live-streaming in the browser;

determining, according to the first information for audio and video gathering source, audio and video devices configured to provide audio and video data, and obtaining audio and video frames output by the audio and video devices; and performing, according to the second information for audio and video configuration, audio and video encoding on the audio and video frames output by the audio and video devices, to obtain the audio and video information being used during the live-streaming in the browser.

20. The electronic device according to claim 19, wherein performing the audio and video encoding on the audio and video frames output by the audio and video devices comprises:

performing, through a webpage audio and video coder-decoder on the browser, the audio and video encoding on the audio and video frames output by the audio and video devices.

* * * * *